United States Patent
Solano

[19]

[11] Patent Number: 6,019,192
[45] Date of Patent: Feb. 1, 2000

[54] GLASS-CARRYING TRESTLE

[75] Inventor: Angel Estaun Solano, Huarte-Arakil, Spain

[73] Assignee: Industrias Laneko, S.A.L., Spain

[21] Appl. No.: 09/160,736

[22] Filed: Sep. 25, 1998

[30] Foreign Application Priority Data

Sep. 29, 1997 [ES] Spain .................................. P-9702034

[51] Int. Cl.⁷ .................................................. E04G 1/00
[52] U.S. Cl. ............................................................ 182/153
[58] Field of Search .................................. 182/153, 152, 182/69.5, 127, 225; 248/277.1

[56] References Cited

U.S. PATENT DOCUMENTS 2,959,244  11/1960  Fedde ...................................... 182/69.5

FOREIGN PATENT DOCUMENTS 613397  12/1960  Italy ....................................... 182/152

*Primary Examiner*—Alvin Chin-Shue
*Attorney, Agent, or Firm*—Bierman, Muserlian and Lucas

[57] ABSTRACT

Glass-carrying trestle made up of a base structure with means to be mounted on the load platform of a vehicle. It is formed by a number of crossbars arranged in two sets withmeans to support/hold the glass to be transported in an upright position and also has means to fold the crossbars at least as regards height (in one set they rise/descend maintaining their horizontality from a lower position—folded— to a higher position—unfolded—and in the other, where the crossbars are joined to the first ones, they tilt with respect to the former between two extreme positions, horizontal folded—and upright—unfolded, respectively.

5 Claims, 2 Drawing Sheets

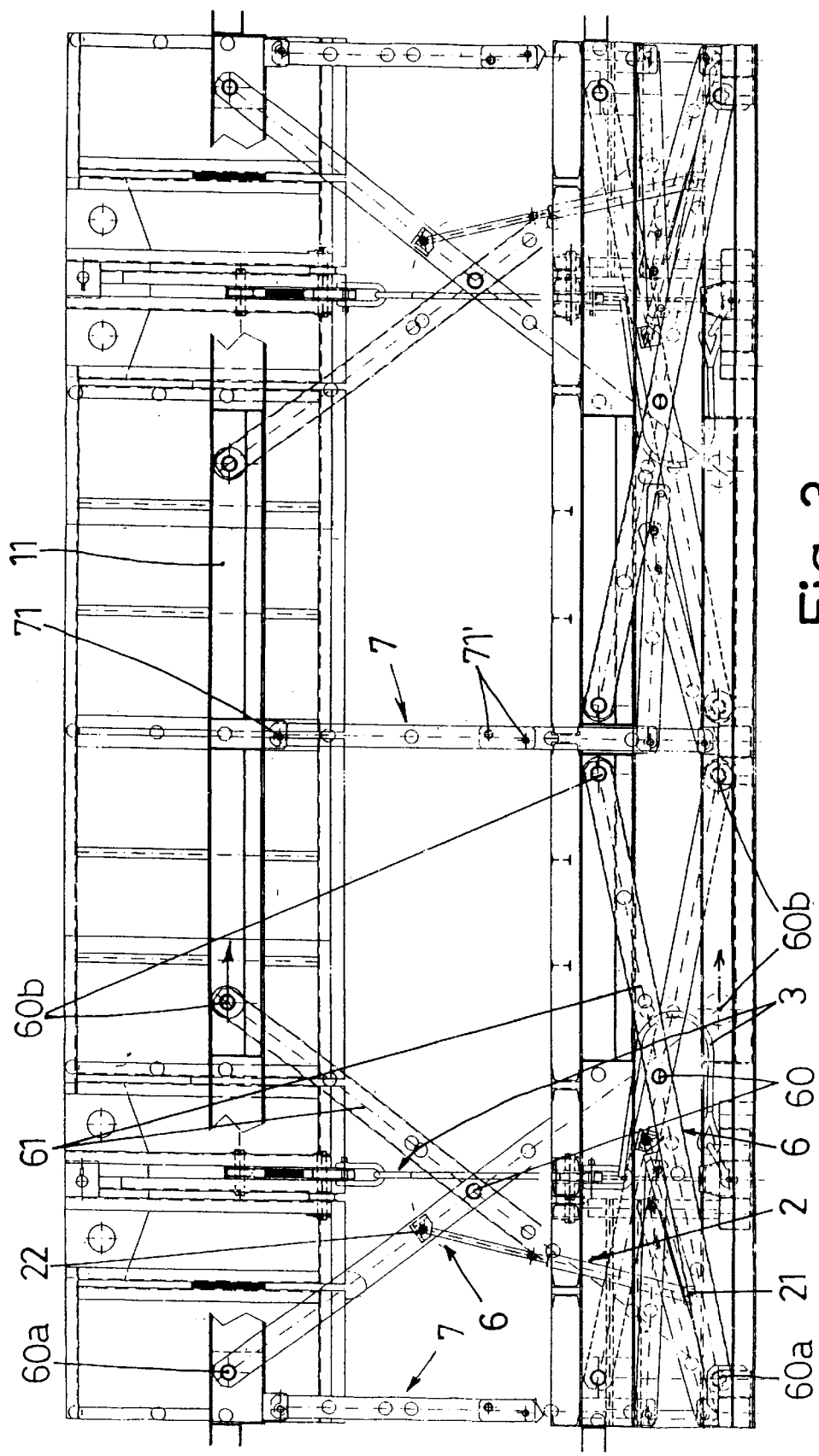

GLASS-CARRYING TRESTLE

This invention deals with a glass-carrying trestle of the type made up of a base structure with means to be mounted on the loading platform of a vehicle and formed by a number of crossbars able to support/hold the glass to be transported in columns in an upright position.

These types of trestle have been known for many years, in varying sizes—and even with means of different types—to support/hold the glass based on its size, weight and delicacy.

All known glass-carrying trestles have the characteristic of being provided with permanent crossbars as regards the structure and of being placed on the loading platform of a vehicle either temporarily or permanently, but always exclusively, meaning that when glass is not being transported (for example on the return journey) it is necessary to maintain the trestle "loaded" on the platform of the vehicle, thus disabling it to be used for any other type of loads.

The glass-carrying trestle, according to the invention, has the characteristic of being collapsible: the crossbars are not permanent as regards the base structure and it has the means so that the crossbars can adopt at least two different positions on the base structure that is attached to the loading platform of the vehicle. These positions are folded and unfolded.

In the unfolded position the trestle is the same as a standard trestle, but in the folded position it has a minimum height and offers a completely horizontal upper surface which becomes the load surface for the platform of the vehicle and thus can admit another load of any type in addition to the glass-carrying trestle.

To better understand the purpose of this invention, a preferential way of practical performance liable to accessory changes that do not impair its basis, is represented in the drawings.

FIG. 3 represents an elevated view of the glass-carrying trestle, according to the invention, in the unfolded position corresponding to FIG. 1. The glass-carrying trestle in the folded position corresponding to FIG. 2 is outlined.

Figure 1:
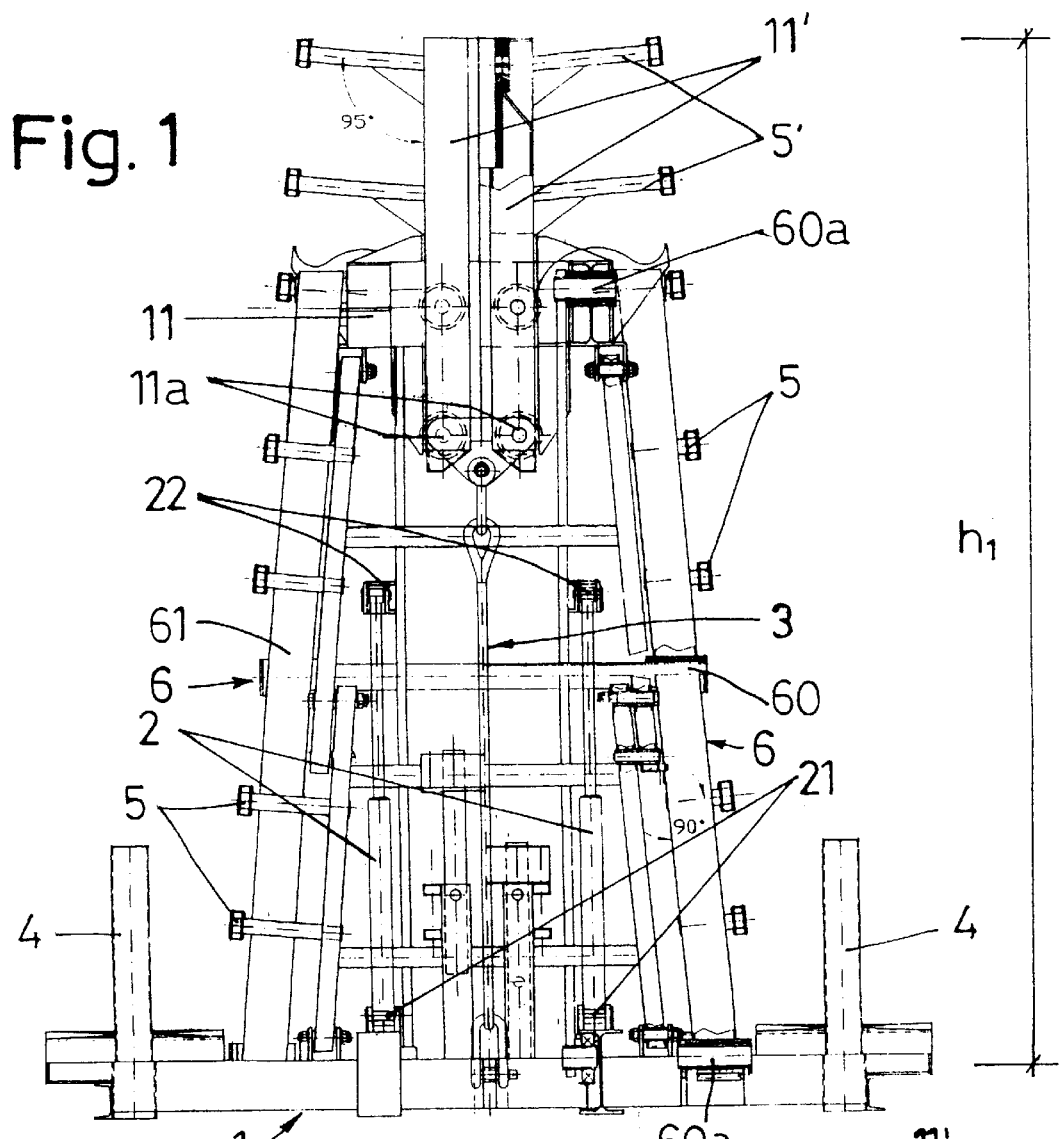
FIG. 1 represents a frontal view of a glass-carrying trestle, according to the invention, in the unfolded position.

The following is a description of an unlimited, practical performance example of this invention.

This invention deals with a glass-carrying trestle of the type made up of a base structure with means to be mounted on the loading platform of a vehicle and formed by a number of crossbars (11), (11') attached to it and with means (5), (5') able to support/hold the glass to be loaded.

In accordance with the invention and as per the represented drawings, the crossbars (11), (11') are arranged in a non-permanent way on the base structure (1) and have means (2), (3), (4) so that the crossbars (11), (11') adopt at least two different positions as regards the base structure (1)—positions that correspond to the folding and unfolding of the glass-carrying trestle.

Figure 2:
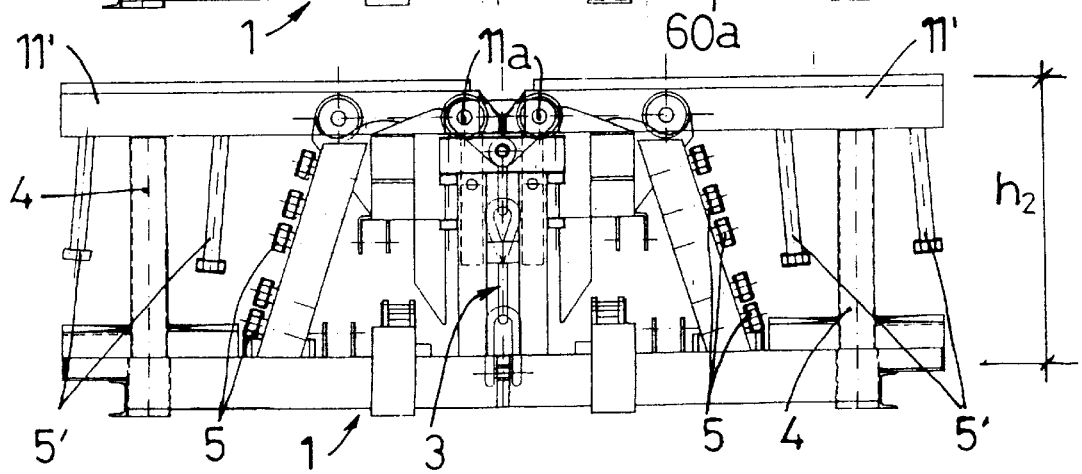
FIG. 2 represents a frontal view of a glass-carrying trestle, according to the invention, in the folded position.

For the unlimited practical performance represented in the attached drawings:

The means (2) are fluid actuating devices—hydraulic or pneumatic cylinders—associated to sets of scissors (6) whose arms (61), in turn are joined to crossbars (11) and to the base structure (1) by one of the ends of the permanent joints (60a). The other end of the arms (61) is freely guided (60b) (see FIG. 2). Each hydropneumatic cylinder (2) is joined by the end of its sleeve (21) to the base structure (1) and by the end of its piston (22) to one of the arms (61) of the corresponding scissors (6).

The means (3) are, specifically, non-rigid stiffeners associated to crossbars (11') and to the base structure (1) by their respective ends. They limit the height of the set, that is, its unfolded position.

The means (4) are supports that are in the base structure itself. They limit the degree of turning of the crossbars (11'), that is, the folded position of the set.

The crossbars (11) and the crossbars (11') are interconnected and the latter (11') have the possibility of turning as regards the former (11)—joints (11a).

The glass-carrying trestle, according to the invention, is completed with dismountable struts (7) that are joined (71) to the base structure (1), at least, and to the crossbars (11) when the set is in the unfolded position. Based on the length of these struts (7), intermediate joints (71') may be provided that continually relate various strut parts (71), although these joints (71') must always be in pairs to maintain the stiffness of the strut (7) thus formed.

With this structuring, and assuming an unfolded position that allows loading the glass panes and occupies a total height ($h_1$) to fold the glass-carrying trestle, first it is enough to remove the struts (7) and then operate the cylinder sets (2) to tilt the scissors (6) and make the crossbars (11), always maintained horizontally, to descend. The crossbars (11') tilt with respect to the crossbars (11) until they bump into the supports (4) which, at that moment, are also maintained on a horizontal surface forming a load surface at a minimum height ($h_2$) on the platform of the vehicle where the glass-carrying trestle is placed.

The glass-carrying trestle of the present invention is of the type formed by a base structure with means to be mounted on the load platform of a vehicle and formed by a number of crossbars able to support/hold the glass to be transported in columns in an upright position. It is characterized by the fact that said base structure also has the means to fold the crossbars to reduce the height, with said means being formed by:

a) At least one fluid actuating device, associated with the base structure and with a set of scissors, each joined respectively to the base structure and to a set of first independent crossbars, which rise/descent maintaining their horizontality from a lower position—folded—to a higher position—unfolded;

b) At least one mechanical actuating device which, associated with the base structure and sets of second crossbars joined to the first crossbars, with the possibility of the latter tilting as regards the former between two extreme positions, that is horizontal—folded—and upright—unfolded—, limits the height of the set in its unfolded position;

c) At least one support for each set of said second crossbars which, coming out of the base structure, limits their angular run and the height of the set—in the folded position.

It is further characterized by the fact that each fluid actuating device is a set of hydropneumatic cylinders with its sleeve joined to the base structure and its piston joined to one of the arms of the corresponding set of scissors.

Additionally, it is characterized by the fact that each mechanical actuating device is a non-rigid stiffener, able to be withdrawn and joined by its ends to the base structure and to two opposing tilting crossbars, respectively.

The glass-carrying trestle can also be characterized by the fact that, in addition, it has one or various dismountable struts that interconnect the base structure and the mentioned first crossbars, contributing to the stiffness of the set in its unfolded position.

I claim:

1. In a glass-carrying trestle having a base structure mounted onto a load platform of a vehicle and a number of crossbars for supporting and holding glass in an upright position the improvement comprising: said base structure having a means for folding the trestle to reduce the height of the trestle and create a platform from said crossbars when said trestle is in a folded position, said means for folding comprising:

a) at least one fluid actuating device connected at one end to the base structure and at the other end to a set of scissors, wherein one end of the scissors is connected to the base structure;

b) a set of first crossbars connected to the other end of the scissors, the first crossbars maintaining a horizontal position in the folded position and in an unfolded position;

c) a set of second crossbars which are movably connected to the first crossbars, the second crossbars tilting as regards the first crossbars between the folded and unfolded positions so as to create the platform in the folded position and eliminate the platform in the unfolded position;

d) a mechanical actuating device connected at one end to the base structure and at the other end to the second crossbars to limit the height of the trestle in its unfolded position; and e) at least one support for each of said second crossbars, said support extending upward from the base structure and limiting the height of the trestle in the folded position.

2. The glass-carrying trestle of claim 1 wherein each fluid actuating device is a set of pneumatic cylinders with a sleeve joined to the base structure and a piston joined to one of the arms of the corresponding set of scissors.

3. The glass-carrying trestle of claim 1 wherein each mechanical actuating device is a non-rigid stiffener.

4. The glass-carrying trestle of claim 1 further comprising one or more dismountable struts that interconnect the base structure and the first crossbars when the trestle is in the unfolded position.

5. The glass-carrying trestle of claim 1 wherein each fluid actuating device is a set of hydraulic cylinders with a sleeve joined to the base structure and a piston joined to one of the arms of the corresponding set of scissors.

* * * * *